(12) United States Patent
Sadja et al.

(10) Patent No.: US 8,631,453 B2
(45) Date of Patent: Jan. 14, 2014

(54) VIDEO BRANCHING

(75) Inventors: Aran London Sadja, San Diego, CA (US); Robert Allan Unger, El Cajon, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1042 days.

(21) Appl. No.: 12/286,813

(22) Filed: Oct. 2, 2008

(65) Prior Publication Data

US 2010/0088735 A1 Apr. 8, 2010

(51) Int. Cl.
- *H04N 7/173* (2011.01)
- *H04N 5/445* (2011.01)
- *G06F 3/00* (2006.01)
- *G06F 13/00* (2006.01)

(52) U.S. Cl.
USPC .................. 725/110; 725/40; 725/41; 725/44

(58) Field of Classification Search
None
See application file for complete search history.

(56) References Cited

U.S. PATENT DOCUMENTS

| | | | |
|---|---|---|---|
| 5,774,666 A | 6/1998 | Portuesi | |
| 6,175,840 B1 | 1/2001 | Chen et al. | |
| 6,621,980 B1 | 9/2003 | Gould et al. | |
| 6,771,644 B1 | 8/2004 | Brassil et al. | |
| 7,139,813 B1 | 11/2006 | Wallenius | |
| 2007/0162927 A1* | 7/2007 | Ramaswamy et al. | 725/36 |
| 2008/0008439 A1* | 1/2008 | Liu et al. | 386/46 |

FOREIGN PATENT DOCUMENTS

WO  WO 01/20466 A1  3/2001

OTHER PUBLICATIONS

"Interactive Hot Spots," Imagemaker 360 Virtual Tours, 2008.
"Active Video Watching using Annotation," Nuno Correia and Teresa Chambel, ACM Multimedia, pp. 151-154, 1999.

(Continued)

*Primary Examiner* — Jason J Chung
*Assistant Examiner* — James R Marandi
(74) *Attorney, Agent, or Firm* — Miller Patent Services; Jerry A. Miller (57) ABSTRACT

In certain implementations, a method of displaying a branched chain of Internet Protocol Television (IPTV) video content involves providing a first stream of video content, the first stream of video content having a plurality of video features that appear during a plurality of associated time intervals in the first stream of video content; providing a collection of affiliate video streams related to the plurality of time intervals; providing a set of metadata that associates the time intervals with one of the plurality of affiliate video streams; playing the first stream of video content on an IPTV compatible player device to sequentially reveal the plurality of features of the first stream in their respective time relationships in the first stream via a display driven by the IPTV compatible player device; at the IPTV compatible player device, receiving a selection signal during the associated time interval that selects the video feature being displayed; upon receipt of the selection signal, the IPTV compatible player device accessing the metadata to identify a particular one of the collection of affiliate data streams that is associated with the time interval of the selected video feature; and the IPTV compatible player device ceasing to play the first stream of video content and beginning playing the associated one of the collection of affiliate data streams that is associated with the time interval of the selected feature; whereby, the viewer directly navigates from one stream of video content to an affiliate video. This abstract is not to be considered limiting, since other embodiments may deviate from the features described in this abstract.

29 Claims, 7 Drawing Sheets

(56) References Cited

OTHER PUBLICATIONS

International Search Report and Written Opinion, PCT/US2009/058599, Dated Nov. 24, 2009.

Office Action in corresponding Korean Patent Application No. 10-2011-70007632, Apr. 19, 2013.

English Translation of Office Action in corresponding Korean Patent Application No. 10-2011-70007632, Apr. 19, 2013.

* cited by examiner

VIDEO BRANCHING

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

At this writing, Internet Protocol Television (IPTV) is an emerging medium for providing essentially on-demand content that is delivered to a television via broadband Internet connection. Content from the Internet has traditionally been delivered to a computer for consumption by the viewer. Although several mechanisms have been provided in the past that essentially utilize the television as a computer display, those mechanisms use more or less conventional browser technology to browse the Internet for content. In such devices and services (e.g., WebTV™), the television set itself functions simply as an elaborate display device that may only coincidentally use the television receiver, per se. In essence, the television's conventional controls are largely overridden by a computer that is connected to the Internet, and the television is relegated to the role of a simple display.

In IPTV, the television set (e.g., such as Sony Corporation's Bravia™ television line with Bravia Internet Video Link—BIVL™) has an adapter that is either integral or interfaced to the television that provides Internet connectivity, but the television set remains a passive viewing device with relatively simple controls available. The Internet adapter provides access to the Internet and provides a guide mechanism that permits the user to select video from the guide. Generally, there may be no keyboard or mouse or touchpad per se and the video experience resembles that of more or less conventional television video except that the video is largely on-demand video and is delivered via the Internet rather than by a cable, satellite or on-air broadcaster. This is a familiar television control mechanism that differs from the control exercised in a computer environment wherein the Internet is browsed by use of browser software.

BRIEF DESCRIPTION OF THE DRAWINGS

Certain illustrative embodiments illustrating organization and method of operation, together with objects and advantages may be best understood by reference detailed description that follows taken in conjunction with the accompanying drawings in which.

DETAILED DESCRIPTION

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system having one or more processors. Embodiments herein are preferably implemented using a computer program controlling actions of one or more processors.

The term "program", as used herein, may also be used in a second context (the above definition being for the first context). In the second context, the term is used in the sense of a "television program" or similar "program material" or content. In this context, the term is used to mean any coherent sequence of audio video content such as those which would be interpreted as and reported in an electronic program guide (EPG) as a single television program, without regard for whether the content is a movie, sporting event, segment of a multi-part series, news broadcast, etc. The term may also be interpreted to encompass commercial spots and other program-like content which may not be reported as a program in an electronic program guide.

Reference throughout this document to "one embodiment", "certain embodiments", "an embodiment", "an example", "an implementation" or similar terms means that a particular feature, structure, or characteristic described in connection with the embodiment, example or implementation is included in at least one embodiment of the present invention. Thus, the appearances of such phrases or in various places throughout this specification are not necessarily all referring to the same embodiment. Furthermore, the particular features, structures, or characteristics may be combined in any suitable manner in one or more embodiments, examples or implementations without limitation.

The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

As previously noted, the IPTV viewing experience resembles that of a conventional television viewing experience with the viewer having control over the experience using more or less conventional remote control. This is desirable in many ways because most viewers will be comfortable with using simple remote control actions, but may be less comfortable with more complex interfaces. However, by virtue of the power of the Internet, viewers have a great deal of resources at their disposal, and it would be desirable for the viewer to be able to easily navigate to relevant content without need for a more complicated interface. It would further be desirable for such an experience to be intuitive and familiar without need to manipulate cursors to "hot spots", "hyperlinks" or utilize browser and search engine technology. In addition, it is desirable for the user to retain familiar television or video tape operational concepts such as trick play (fast forward, fast reverse, slow motion, etc.).

In accord with certain implementations and embodiments consistent with the present invention, a viewer of IPTV is provided with the ability to asynchronously select an alternative video stream based upon a location in a primary stream. Several implementations are presented herein, but it will be clear to those skilled in the art upon consideration of the present teachings that many variations are possible. In one such implementation, a leading metadata packet (or packets) provide information to a playback device (e.g., an IPTV receiver device) that relates a play time in a segment of video to an alternative or affiliate video program that is to be played when the viewer presses a control button on the remote control during a designated segment of time in the primary video. A trailing metadata packet can contain similar information that is used when the primary video is played in reverse (e.g., in trick play modes) or when a current point of play is at a rewind point. In another implementation, the primary video contains time stamps, or may use existing time stamps, to index a separate metadata file that contains alternative or affiliate video details. In certain implementations, the metadata may also contain icons that appear during specific time periods indicating that alternative or affiliate video is available. While the term IPTV is used as the primary example herein with the IPTV experience being described, it is noted that implementations consistent with the present invention are actually TV experiences that are enabled by delivery of content via the Internet.

The terms "alternative" and "affiliate" are used interchangeably herein to mean a video that is affiliated with the main video (or any video that is currently the video playing or point of reference). These terms are with respect to the currently playing video or point of reference in the discussion. It should be noted that although in the simplest form, there is a main video from which a viewer may depart to an affiliate video and return, there is no conceptual limitation of depth in the number of layers or levels of video that can be nested.

Figure 1:
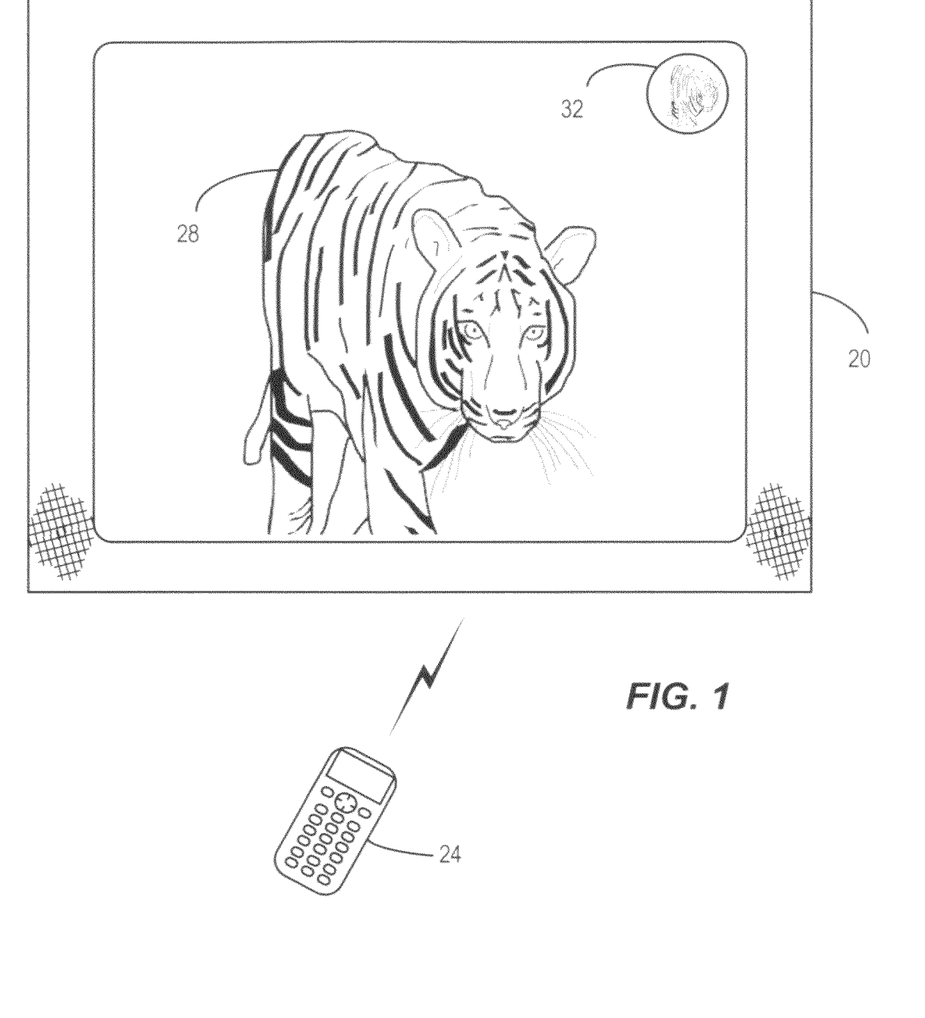
FIG. 1 is an example illustration of a television display used to describe embodiments consistent with the present invention.

Turning now to FIG. 1, consider an IPTV receiver device 20 that is responsive to a remote controller 24. In this illustration, assume the IPTV is "tuned" to a program relating to wildlife. One can reasonably deduce that if the viewer is watching such a documentary, the viewer is interested in various types of wildlife and may be interested in more information when a wildlife creature such as tiger 28 is featured as a part of the documentary. In a computer and Internet based environment, one might carry out a search about "tigers" using a search engine and then use a browser to navigate to various sites of interest about tigers. However, the television viewing paradigm is conventionally a very passive experience by nature. But, even in IPTV, one might have difficulty finding more information about tigers without resorting to more complex interfaces and carrying out browser based searches. However, as suggested above, during production of the video stream of the documentary one might recognize that a person interested in viewing a documentary about wildlife might reasonably wish to delve deeper into the various wildlife presented in the documentary.

Accordingly, in one example embodiment, the viewer can readily switch to a pre-defined stream of video in a continuous and near seamless manner similar to changing channels by pressing a single button on the remote controller 24, which we will call a "select" command for convenience. The viewer is then taken to a new stream of video—an affiliate video—that relates to a feature of the main video (the documentary). In certain embodiments, the affiliate video will be related to a subject that is featured dominantly on the screen during the time period of the selection. In other embodiments, icons such as icon 32 can be made to appear during the time period in which a selection of an affiliate stream is available in order to advise the viewer of such availability. Note, however, that in accord with the present embodiments, the icon is not a link or hot spot, but merely an informational icon. In other embodiments, any other indicator (including implicit indicators in the form of a dominant image on the screen) can be used to advise the viewer of such affiliate content. In example embodiments with implicit indicators, the viewer can simply presume that affiliate content is available related to the main content without any such indicator.

In this example, the "selection" from remote control 24 by the user takes the user essentially directly to a new stream of video that is related to the content that is being displayed at the time of the selection. For example, in this case the viewer might be taken to a static or moving video screen (i.e., a "sub-documentary") about tigers that describes their habitat, prey, predators, population, and other information. Additional layers or levels of affiliate videos can provide a narrower or broader focus on the subject matter. For example, multiple videos can be provided that more narrowly describe the tiger, or more broadly describe the cat family of creatures. Conceptually, by repeated selection from the remote control, the viewer can view a near endless sequence of video content that can be viewed in a manner analogous to a stream of consciousness about tigers and cats that changes with each execution of a "select" command.

When any given path of videos in the hierarchy is exhausted, further actuation of the "select" command can return the viewer to a designated place in the hierarchy. In one example implementation, a select command at the end of the hierarchy will return the user to the beginning of the hierarchy. In other example implementations, the command can return the viewer up one step in the hierarchy, can produce a message to the user indicating that there is no further video in the hierarchy or can have no effect at all.

Figure 2:
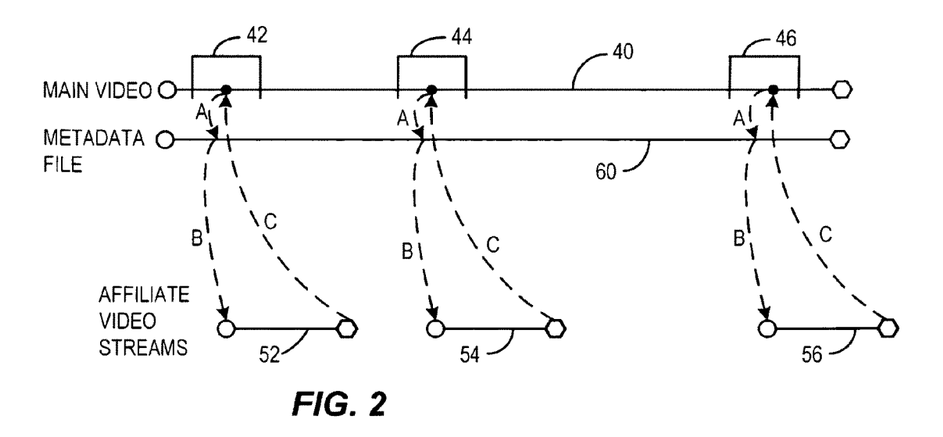
FIG. 2 is an example of a video stream having multiple affiliate videos consistent with certain embodiments of the present invention.

For illustrative purposes, consider the simple map presented in FIG. 2. In this illustration, video is presented as a series of horizontal lines with information links and connections appearing as dashed arrows. A user's action of actuating a "select" function to jump from a one video to another is depicted by a solid dot. The start of each video or metadata is shown as an open circle. While the metadata may be in the form of a file that precedes the beginning of the main video, it is shown conceptually as a stream of information for this illustration. The end of a segment of video or metadata is shown as an open hexagon. Time segments wherein affiliate video is available are shown as vertical lines crossing the video and linked at the top with a line to indicate a start and end of the time period wherein affiliate video is available.

In this simple illustration, main video 40 is provided with three time segments 42, 44 and 46 during which affiliate videos 52, 54 and 56 are available. An icon or other indicator of the presence of affiliate video may or may not be shown to the viewer, or the viewer may be otherwise advised or deduce that affiliate video is available for this main video 40 (e.g., at the beginning of the video). For this example, assume that during time period 42, the viewer enters a "select" command. This select command is represented by the solid dot, as noted above. Upon receipt of the "select" command, the IPTV receiver device 20, via an internal programmed processor looks to the metadata file 60 to identify the affiliate video stream 52. This is represented by path A in the drawing. Upon making the identification to video stream 52, the processor navigates to the affiliate video stream (e.g., using a URI) as indicated by path B and the affiliate video stream begins playing, almost as if the viewer had changed channels to a channel 52 that was automatically affiliated with the main video stream 40 (to provide an analogy to a conventional TV vernacular).

Video stream 52 begins to play as soon as it is possible after the select command and may continue (unless interrupted) until the end of the video stream, at which point in certain example embodiments the video resumes playing the main video stream 40 at the point of departure from that main video stream as depicted by path C. Hence, a continuous flow of content is provided from a main stream of content to an affiliate stream of content by the press of a select button on the remote controller 24. A similar path can be followed to depart from the main video stream 40 to the affiliate streams 54 and 56 during time periods 44 and 46 of the main video, with the designations A, B and C being similarly used.

Figure 3:
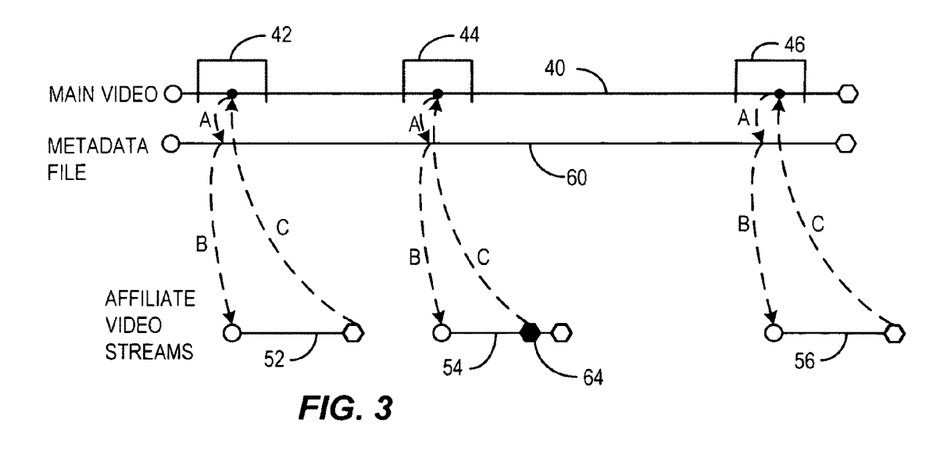
FIG. 3 is an example of a video stream having multiple affiliate videos consistent with certain embodiments of the present invention.

FIG. 3 depicts another example with a minor variation of the scenario shown in FIG. 2, wherein during the viewing of affiliate video 54, the viewer decides at 64 that he is no longer interested in affiliate video 54, and enters an "end" command (or equivalent) at the remote controller 24 which ends the current video stream (54) whereupon the affiliate video stream is halted as indicated by the filled hexagon at 64 and the process then returns to playing the original main video stream (or other stream in the hierarchy.

Figure 4:
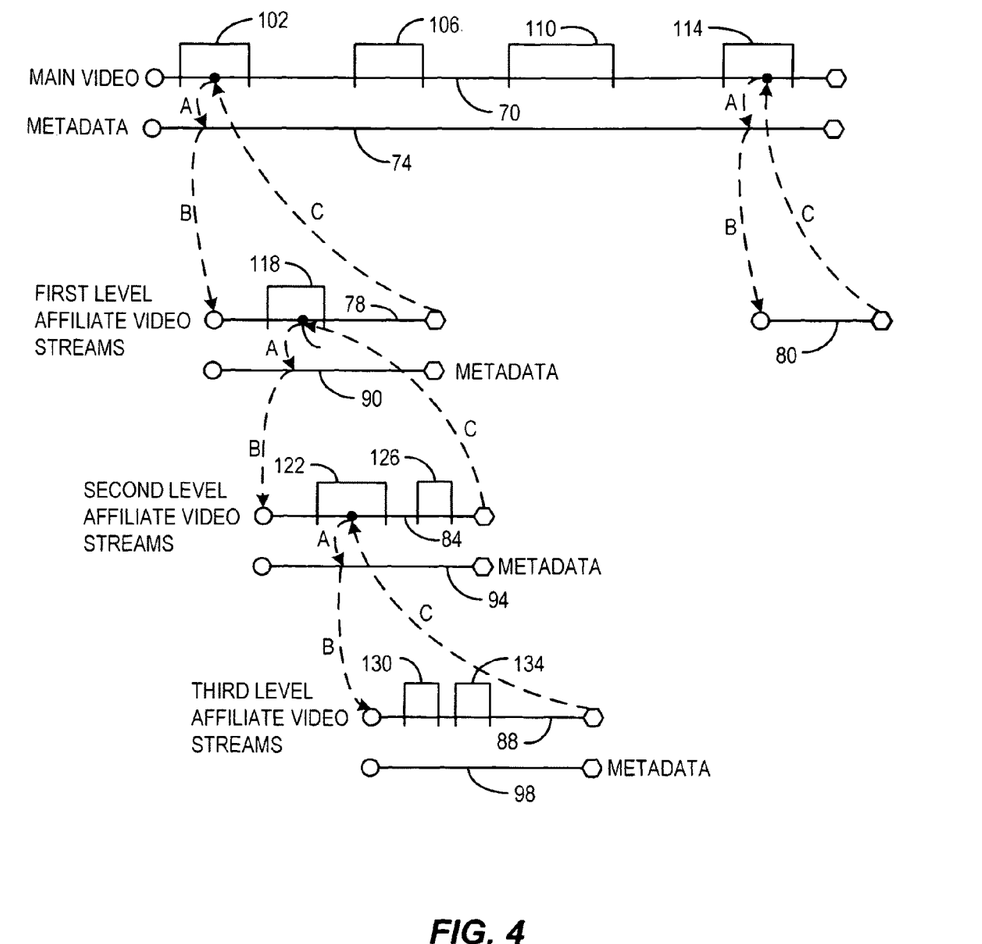
FIG. 4 is an example of a video stream having multiple levels of affiliate videos consistent with certain embodiments of the present invention.

FIG. 4 depicts an example hierarchical arrangement of affiliate video streams and demonstrates how a viewer can navigate or "surf" among the plurality of streams in a continuous flow with a single set of controls that simply provide a select function or an end function as previously described. In this example, the main video stream (meaning the viewer's original selection) is shown as 70 and its associated metadata file is shown as 74. For purposes of this illustration, there may be many relevant time segments and many relevant affiliate video streams, but for simplification of the illustration, not all time segments are selected and not all affiliate video streams are shown. Two affiliate video streams are shown as 78 and 80 that are directly linked to the main video 70 at a first level. Affiliate video 78 has its own affiliate video 84 at a second level or layer and affiliate video 84 has two affiliate videos at a third level, with only one shown as 88 in the present illustration. Affiliate video 88 also has two affiliate videos associated therewith, but neither are shown to simplify the illustration.

Since affiliate video 80 has no sub-affiliates at a second layer, it is shown as in FIGS. 2-3 without any associated metadata. However, affiliate video 78 has metadata 90, affiliate video 84 has metadata 94 and affiliate video 88 has metadata 98. Metadata 90, 94 and 98 may appear at the beginning of the video streams 78, 84 and 88, may be intermingled therewith or may be a part of the metadata 74 of the main video without limitation, but the metadata is shown associated with its respective video stream for ease of understanding. The paths A-B-C are shown for each link in the video, and can be traced through the video hierarchy as follows for this example.

In this example, main video 70 is shown to have four time periods 102, 106, 110 and 114 during which time affiliate videos are available. Two of the sets of affiliate videos are shown associated with time periods 102 and 114. Affiliate video 80 is shown to be associated with time period 114, and with viewer selection, the process path A is taken to the metadata 74 which identifies affiliate video stream 80 which is started as depicted by path B and played through completion as shown. At the end of affiliate video 80, the main video proceeds from where it left off.

Earlier in main video 70, a more complex scenario is depicted in which multiple levels of affiliate videos are traversed in an asynchronous chain that the viewer navigates by simply using the "select" command as previously described. In this scenario, during time period 102 of main video 70, the user enters a "select" command that leads to metadata 74 via path A and on via path B to a first level affiliate video 78 which begins playing at the beginning. The viewer can then make a selection during time period 118 to navigate from a first level to a second level affiliate video 84 using data from metadata 90, wherein the second level video 84 may be affiliated with the first level affiliate video 78 (but not necessarily directly affiliated with the main video 70. In this case, selection of the first level affiliate video 78 during time period 118 leads through another path A to its related metadata 90 and on via path B to the second level affiliate video 84 which starts playing. Second level affiliate video 84 is shown in this example to have two time periods 122 and 126 during which the viewer can select yet another level or layer of video. In this example, the viewer makes a selection via a "select" command during the first of the two time periods 122 of second level affiliate video 84. This leads the process via path A to metadata 94 for second level affiliate video 84 to a third level of affiliate video 88 where third level affiliate video 88 begins playing from the beginning. This third level affiliate video 88 is shown to have two time periods 130 and 134 during which the user could make selections to yet a fourth level of affiliate videos, but for the sake of simplification, the fourth level is not shown, and for purposes of this example, it is assumed that the user views the third level affiliate video 88 from start to end and access to metadata 98 is not made.

When the third level affiliate video 88 ends, then path C is taken from 88 back to the second level affiliate video 84 which resumes at the point where it was interrupted. Second level affiliate video 84 continues playing to the end and then takes path C to the first level affiliate video 78, which also resumes at the point where it left off. At the end of first level affiliate video 78, the main video 70 resumes where it left off—again following a path C. It is noted that at any point in any of the affiliate videos, a "stop" or "end" command could be issued to stop the playing video and jump back one level to another video stream. Moreover, it will be clear upon consideration of the previous discussion that other affiliate videos can be accessed in a similar manner by the viewer making selections at 106, 110, 116, 130 or 134. For ease of discussion and to maintain clarity of the drawing, affiliate paths for these selections are not shown.

In the above examples, it is noted that the time periods are not shown to be contiguous. However, in other examples, the boundaries of the time periods can be contiguous with the beginning of a time period serving as an implicit end to a prior time period.

Figure 5:
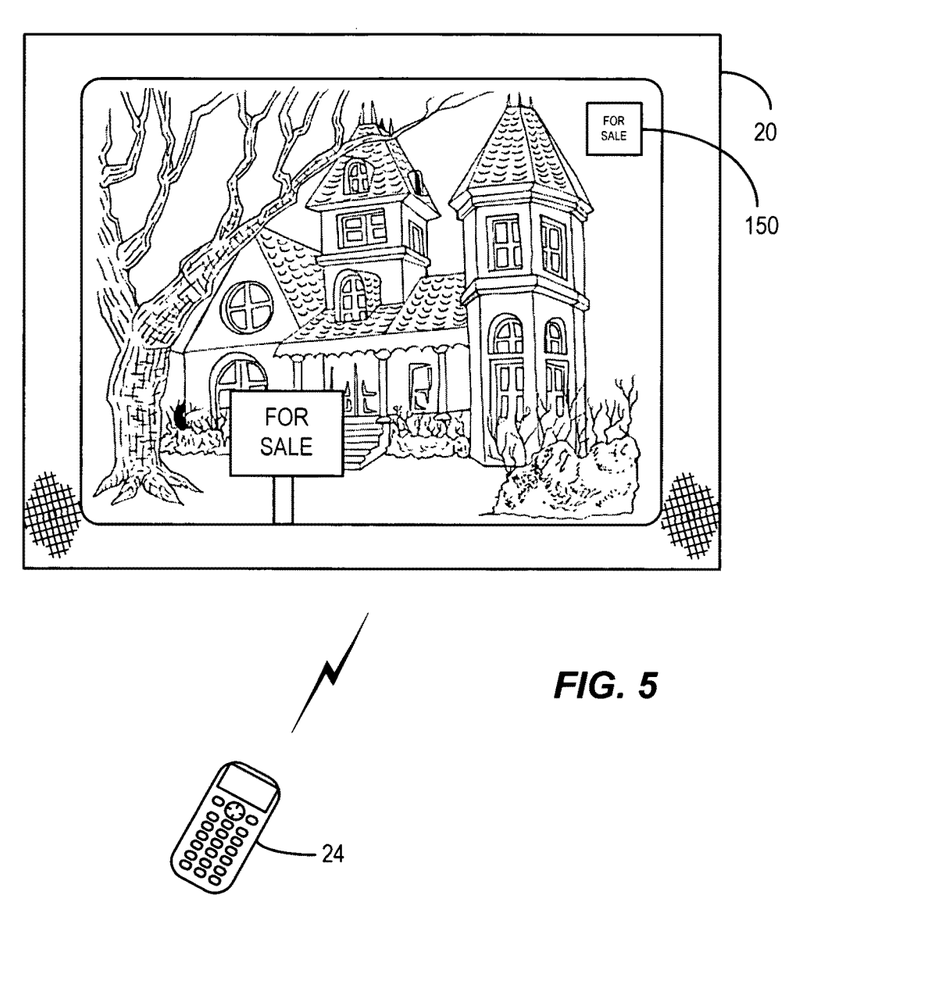
FIG. 5 is an example illustration of a television display used to describe embodiments consistent with the present invention.

In IPTV, it is contemplated that all types of video content will be available to viewers, including movies, conventional television programming, shorts and commercial programming. Quite frequently, the video content provides a top level showcase of subject matter. But, a user may want more detail on one or more subjects introduced by the video. This may mean noting the item(s) of interest and then navigating to a more detailed video later. Another example might be viewing a video showcasing real estate in a neighborhood or community. One of the homes might catch the eye of the viewer as depicted in FIG. 5 as a home that is for sale. Using the present technology, the viewer can be provided with the ability to initiate an on screen display with additional textual or video information. In the example of a real estate tour, the viewer sees the property as shown on the television display 20 and may also see a displayed icon 150 or deduce from context (e.g., presence of a "for sale" sign) or other information provided about the video that he can enter a "select" command to bring up another video or even still image that provides a bring up a "Stats" sheet with key information (statistics) about the property, such as price, square footage, rooms, etc. An additional selection could then launch the video specific to that property such as a video tour. Within the tour, the user might navigate to a different room with each successive selection command in the manner previously described. At a final level of video, or at some point in one or more of the video levels, the viewer can be provided with contact information for a sales agent or the like. The user could also be provided with a global command that ends all video presentations at any given point so that the viewing process can be ended at any point desired by the viewer.

In certain implementations, data is embedded in a video or a parallel metadata track to provide alternate content selections as a video is being played. In the above real estate example, pressing "select" or similar control button when the home of interest is on screen during the quick tour will cause the video to be suspended (or stopped) and a detailed video of the property of interest will be called up and start playing. This technique could be used showcasing many products in addition to real estate as well as for general seamless navigation to related affiliate content.

In one implementation, parallel metadata is used. Here two files are retrieved from the server—a video file and a metadata file. Visual cues can be embedded in the actual video to indicate the affect of a "select" input in certain implementation. The metadata file carries a sequence of time markers and an identifier such as a URI or a URL to be played when a "select" occurs between two time markers. The time markers can include a start and end marker, or an end can be implicit when the next start time marker is encountered. In some implementations, the "end action" when the branched video completes could be optional, or default in which the play could return to original index video.

Figure 6:
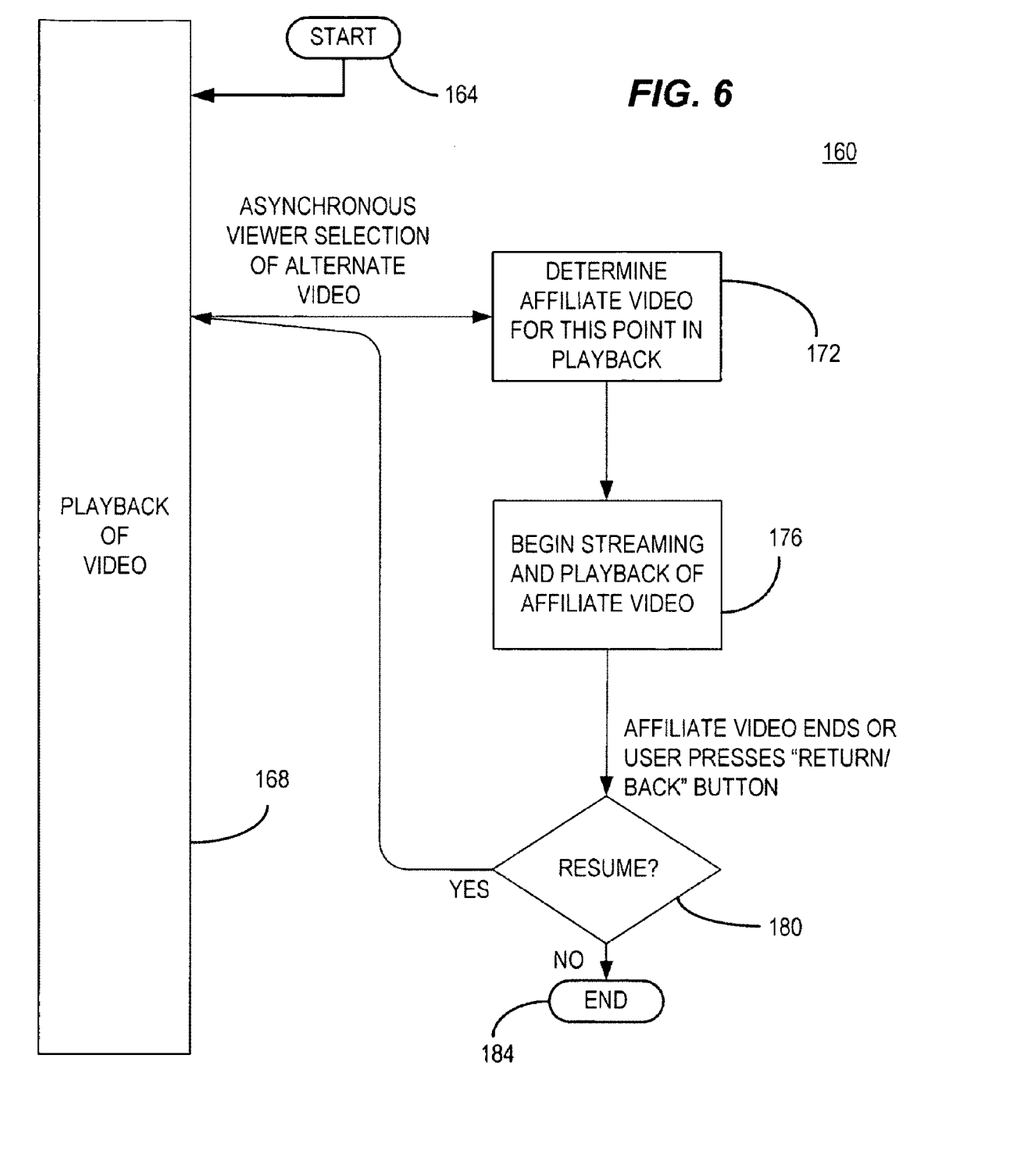
FIG. 6 is an example of a flow chart depicting an implementation consistent with certain embodiments of the present invention.

Process 160 depicted in FIG. 6 shows one embodiment consistent with certain implementations of the invention starting at 164 wherein a viewer selects a main video 168 for viewing. This can be done, for example, by making a selection from a program guide. At a point in the play of the video 168, the viewer may make an asynchronous selection to jump to another video (a predefined affiliate video that is related to the time during which the selection is made). At this point, metadata is referenced at 172 to determine how the system is to navigate to the affiliate video associated with the time period during which the selection is made. Then, at 176, the affiliate video is opened and played (e.g., streaming) of the affiliate video begins. Play of the affiliate video proceeds until either the affiliate video ends or the viewer chooses to stop the affiliate video (which can include stopping to proceed to another affiliate video affiliated with the affiliate video). In any case, play of the original video 168 can resume at the point at which the play left off. In this illustrative process, the user can be presented with the option at 180 via an on-screen menu or direct command from the remote controller, to either return to the originating video 168 or terminate viewing at 184. If the viewing is to be terminated, the process ends. At this point, in certain implementations, the user may be redirected to a program guide or the like or other options may be implemented. This same process or a similar process can be used iteratively for each layer of video without regard for whether video 168 is a main video selection or an affiliate video from another main video selection anywhere on a chain of related video streams.

Figure 7:
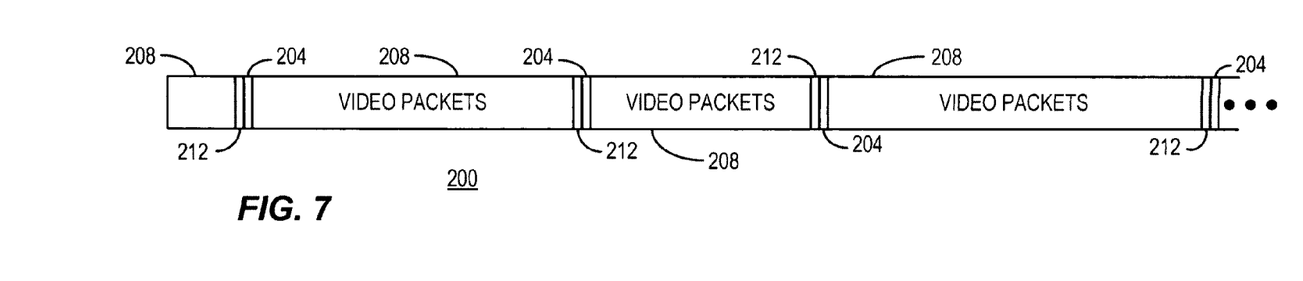
FIG. 7 is an example illustrating a video signal with embedded metadata packets consistent with certain embodiments of the present invention.

Referring now to FIG. 7, in one implementation, a video file 200 suitable for use in conjunction with certain implementations is provided with embedded metadata packets as depicted. In this implementation, one or more metadata packets are provided at intervals distributed throughout the video file 200. In this implementation, a leading metadata packet 204 precedes each segment of video packets 208 that can be used to access an affiliate video segment and a trailing metadata packet 212 (which could be realized as a single packet with both types of metadata in other implementations). The embedded metadata packets 204 and 212 can be used to define the starting and ending points of the selectable segments and can contain pop-up icon information (if any) and information that is used to access the affiliate video. In this implementation, leading metadata packet (or packets) 204 provide information to a playback device (e.g., an IPTV receiver device) that relates a play time in a segment of video to an alternative or affiliate video program that is to be played when the viewer presses a control button on the remote control during a designated segment of time in the primary video. Trailing metadata packet or packets 212 can contain similar information that is used when the primary video is played in reverse (e.g., in trick play modes) or when a current point of play is at a rewind point. In another implementation, the primary video contains time stamps, or may use existing time stamps, to index a separate metadata file that contains alternative or affiliate video details. As noted, in certain implementations, the metadata may also contain icons that appear during specific time periods indicating that alternative or affiliate video is available.

Figure 8:
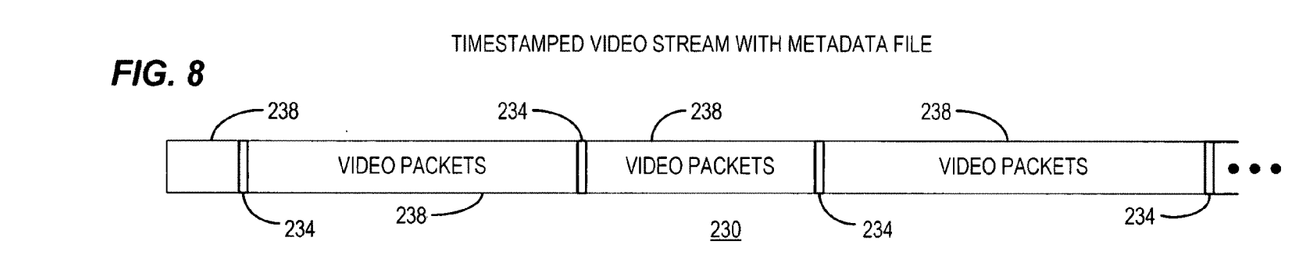
FIG. 8 is an example illustrating a video signal with embedded timestamps consistent with certain embodiments of the present invention.
Figure 9:
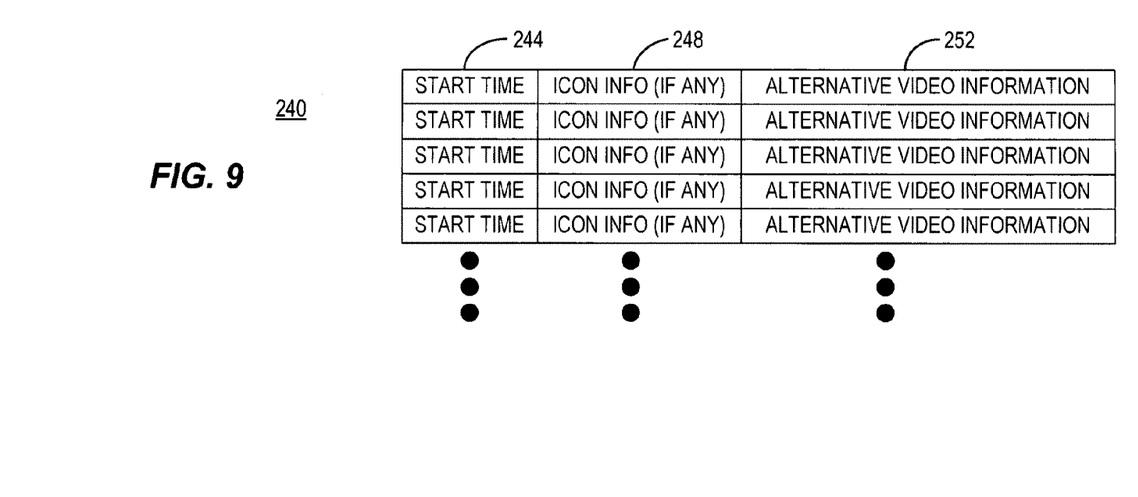
FIG. 9 is an example illustrating one implementation of a metadata file consistent with certain embodiments of the present invention.

Another implementation is depicted in FIG. 8 in which a video stream 230 incorporates timestamp packets 234 (or utilizes existing timestamps) interspersed with the video packets 238 in conjunction with a metadata file 240 as depicted with FIG. 9. The timestamp packets or time data from any suitable time stamp information is cataloged in the metadata file 240 such that the time data 244 for each relevant time is associated in a database format (or other suitable format) to icon data 248 (if present) and data 252 which provides information needed by the system to navigate to the affiliate video data if a selection is made between two time stamps (e.g., leading and trailing or two leading time stamps, or a defined range of times in the metadata). Many variations will occur to those skilled in the art upon consideration of the present teachings.

Figure 10:
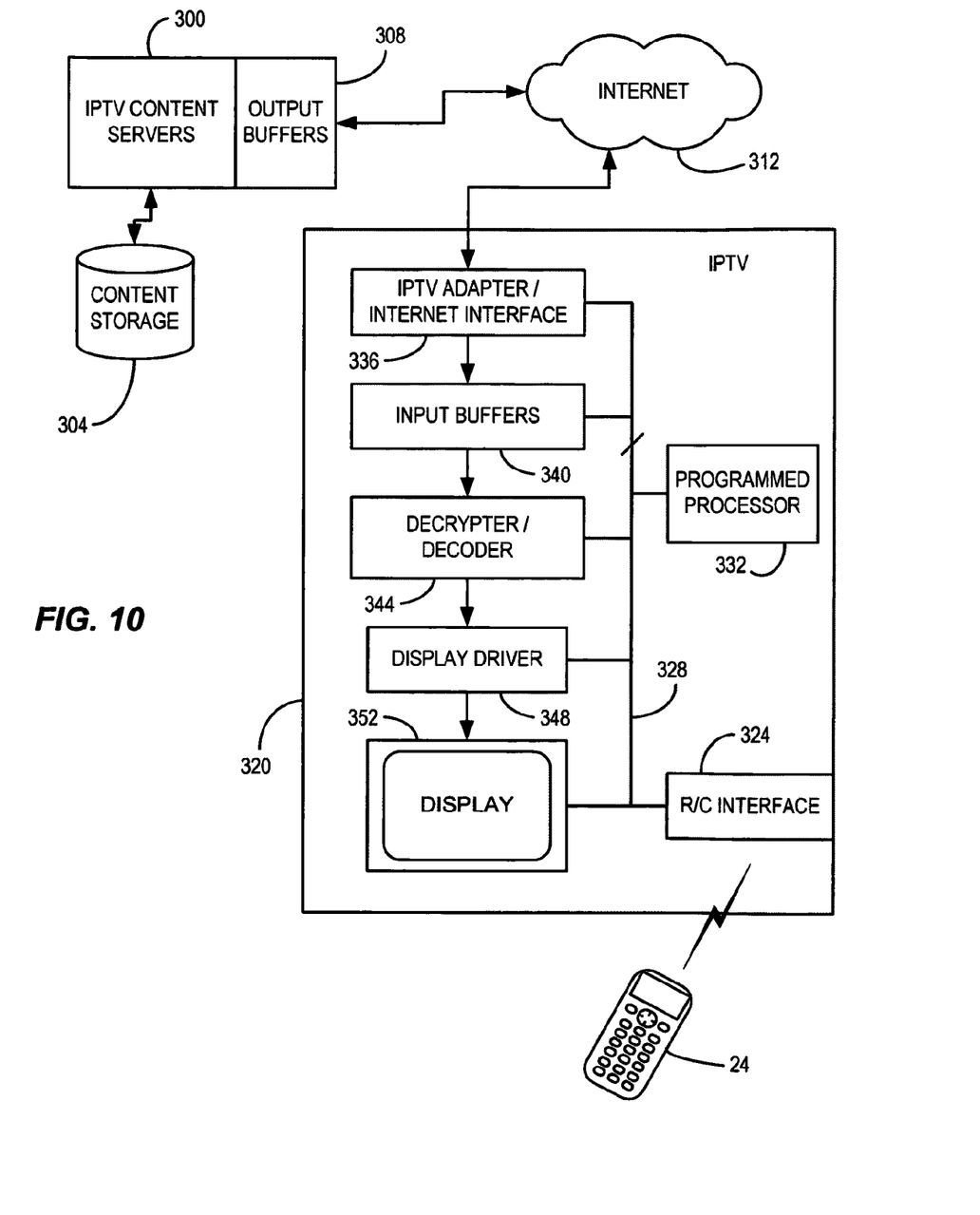
FIG. 10 is an illustrative example block diagram of an IPTV system consistent with certain embodiments of the present invention.

Referring now to FIG. 10, an IPTV system is depicted in which a content provider provides content from servers 300 that are retrieved from disc storage media or other suitable storage media 304. Content such as that formatted in any of the formats discussed herein via output buffers 308 to the Internet 312. This content is retrieved by IPTV device 320 in a manner similar to on-demand video by selection by the viewer using remote controller 24. The operations as instructed by the remote controller 24 are received as commands at a remote controller interface 324. In this example implementation, one or more data communication buses 328 is used to interconnect the programmed processor 332 with its related support components.

The programmed processor 332 controls an IPTV Internet interface 336 to link to the server that delivers the selected content via the Internet 312. The received stream of packetized content is delivered through various input buffers 340 to decryption and decoding circuits 344 (depending upon whether the content is encrypted) and produces an output stream (which may also be buffered) that is sent to the display driver circuit 348. The display driver circuit converts the output of the video decoder of 344 into signals suitable for driving a display panel or other display device 352 where the content is presented to the viewer. The processes described above are carried out by the programmed processor 332 operating in cooperation with the associated circuitry described. It will be understood by those skilled in the art that programmed processor 332 incorporates internal and/or associated external memory such as RAM, ROM or disc storage that stores data, programs and other constructs used in carrying out the disclosed processes.

As described above, navigation from one video to an affiliate video can be carried out substantially seamlessly without need for a browser-like function. Hence, the viewer directly navigates using simple select commands to produce a stream of multiple related videos.

While in certain embodiments as described above, each video may be linked to an affiliate video, in other embodiments, the selection operation can send information defining a hierarchy position to a server which generates custom content for immediate display based upon the position in the hierarchy of a particular video. Moreover, a hybrid experience can also be provided wherein one level of video (e.g., the top level) can be delivered via a terrestrial, cable or satellite television method in a conventional manner and stored on a Personal Video Recorder (PVR). During playback, the embedded metadata can be used to access IP content as affiliate video content. Other combinations of media access can also be implemented without departing from embodiments consistent with the present invention.

Thus, a method of displaying a branched chain of Internet Protocol Television (IPTV) video content involves providing a first stream of video content, the first stream of video content having a plurality of video features that appear during a plurality of associated time intervals in the first stream of video content; providing a collection of affiliate video streams related to the plurality of time intervals; providing a set of metadata that associates the time intervals with one of the plurality of affiliate video streams; playing the first stream of video content on an IPTV compatible player device to sequentially reveal the plurality of features of the first stream in their respective time relationships in the first stream via a display driven by the IPTV compatible player device; at the IPTV compatible player device, receiving a selection signal during the associated time interval that selects the video feature being displayed; upon receipt of the selection signal, the IPTV compatible player device accessing the metadata to identify a particular one of the collection of affiliate data streams that is associated with the time interval of the selected video feature; and the IPTV compatible player device ceasing to play the first stream of video content and beginning playing the associated one of the collection of affiliate data streams that is associated with the time interval of the selected feature; whereby, the viewer directly navigates from one stream of video content to an affiliate video.

In certain embodiments, each of the video features include features constituting a dominant image in the video during its associated time interval. In certain embodiments, the process further involves displaying an indicator on the display that indicates that an affiliate video stream is available associated with the feature displayed during the associated time interval. In certain embodiments, the process further involves resuming play of the first video stream after play of the affiliate video stream is completed. In certain embodiments, the resuming is carried out as a result of receipt of a signal indicative of a selected option authorizing the resuming. In certain embodiments, the affiliate video stream further includes time periods that are linked to another set of metadata and another affiliate video stream. In certain embodiments, the set of metadata provides links that lead to multiple levels of affiliate videos. In certain embodiments, the metadata resides in one or more packets that precede the first video stream. In certain embodiments, the metadata resides in one or more packets that are distributed throughout the first video stream. In certain embodiments, the metadata references time stamps residing within the main video data. In certain embodiments, the main video stream has an affiliate video stream of another video stream. In certain embodiments, responsive to receipt of the selection signal sending information defining a hierarchy position to a server which generates custom content for immediate display based upon a hierarchical position in a currently playing video stream. In certain embodiments, the main video stream is delivered by one of a conventional terrestrial, cable or satellite television method and stored on a Personal Video Recorder (PVR), and wherein during playback, the accessing of the metadata is carried out during said playback.

Another method of displaying a branched chain of Internet Protocol Television (IPTV) video content involves providing a first stream of video content, the first stream of video content having a plurality of video features that appear during a plurality of associated time intervals in the first stream of video content, wherein at least some of the video features constitute a dominant image in the video during its associated time interval; providing a collection of affiliate video streams related to the plurality of time intervals; providing a set of metadata that associates the time intervals with one of the plurality of affiliate video streams; playing the first stream of video content on an IPTV compatible player device to sequentially reveal the plurality of features of the first stream in their respective time relationships in the first stream via a display driven by the IPTV compatible player device; displaying an indicator on the display that indicates that an affiliate video stream is available associated with the feature displayed during the associated time interval; at the IPTV compatible player device, receiving a selection signal during the associated time interval that selects the video feature being displayed; upon receipt of the selection signal, the IPTV compatible player device accessing the metadata to identify a particular one of the collection of affiliate data streams that is associated with the time interval of the selected video feature; the IPTV compatible player device ceasing to play the first stream of video content and beginning to play the associated one of the collection of affiliate data streams that is associated with the time interval of the selected feature; resuming play of the first video stream after play of the affiliate video stream is completed; and whereby, the viewer directly navigates from one stream of video content to an affiliate video.

In certain embodiments, the resuming is carried out as a result of receipt of a signal indicative of a selected option authorizing the resuming. In certain embodiments, the affiliate video stream further includes time periods that are linked to another set of metadata and another affiliate video stream. In certain embodiments, the set of metadata provides links that lead to multiple levels of affiliate videos. In certain embodiments, the metadata resides in one or more packets that precede the first video stream. In certain embodiments, the metadata resides in one or more packets that are distributed throughout the first video stream. In certain embodiments, the metadata references time stamps residing within the main video data. In certain embodiments, responsive to receipt of the selection signal sending information defining a hierarchy position to a server which generates custom content for immediate display based upon a hierarchical position in a currently playing video stream. In certain embodiments, the main video stream is delivered by one of a conventional terrestrial, cable or satellite television method and stored on a Personal Video Recorder (PVR), and wherein during playback, the accessing of the metadata is carried out during said playback.

A data structure stored in an electronic computer readable storage medium that facilitates simplified navigation to affiliate video streams has a first segment of video content, the first segment of video content having a plurality of video features that appear during a plurality of associated time intervals in the first segment of video content; a set of metadata that associates the time intervals with one of a plurality of affiliate video streams; and wherein the data structure facilitates accessing the metadata upon selection at an IPTV compatible player device during a time interval to identify a particular one of the collection of affiliate data streams that is associated with the time interval of the selected video feature, wherein upon selection at the IPTV compatible player, ceasing to play the first segment of video content and beginning playing the associated one of the collection of affiliate data segments that is associated with the time interval of the selected feature.

In certain embodiments, at least some of the video features include features constituting a dominant image in the video during its associated time interval. In certain embodiments, the metadata further includes definition of an indicator for display that indicates that an affiliate video stream is available associated with the feature displayed during the associated time interval. In certain embodiments, the set of metadata provides links that lead to multiple levels of affiliate videos. In certain embodiments, the metadata resides in one or more packets that precede the first video segment. In certain embodiments, the metadata resides in one or more packets that are distributed throughout the first video segment. In certain embodiments, the metadata references time stamps residing within the main video data.

A method of displaying a branched chain of video content providing a first stream of video content, the first stream of video content having a plurality of video features that appear during a plurality of associated time intervals in the first stream of video content; providing a collection of affiliate video streams related to the plurality of time intervals; providing a set of metadata that associates the time intervals with one of the plurality of affiliate video streams; playing the first stream of video content on a player device to sequentially reveal the plurality of features of the first stream in their respective time relationships in the first stream via a display driven by the IPTV compatible player device; at the player device, receiving a selection signal during the associated time interval that selects the video feature being displayed; upon receipt of the selection signal, the player device accessing the metadata to identify a particular one of the collection of affiliate data streams that is associated with the time interval of the selected video feature; and the player device ceasing to play the first stream of video content and beginning playing the associated one of the collection of affiliate data streams that is associated with the time interval of the selected feature; whereby, the viewer directly navigates from one stream of video content to an affiliate video.

In certain embodiments, each of the video features constitutes a dominant image in the video during its associated time interval. In certain embodiments, the method further involves displaying an indicator on the display that indicates that an affiliate video stream is available associated with the feature displayed during the associated time interval. In certain embodiments, the method further involves resuming play of the first video stream after play of the affiliate video stream is completed. In certain embodiments, data defining the indicator display is stored in the metadata. In certain embodiments, the resuming is carried out as a result of receipt of a signal indicative of a selected option authorizing the resuming. In certain embodiments, the set of metadata provides links that lead to multiple levels of affiliate videos.

An Internet Protocol Television (IPTV) receiver device consistent with certain implementations has an Internet interface that receives a first stream of video content, the first stream of video content having a plurality of video features that appear during a plurality of associated time intervals in the first stream of video content. The Internet interface further receives a collection of affiliate video streams related to the plurality of time intervals. The Internet Interface further receives a set of metadata that associates the time intervals with one of the plurality of affiliate video streams. A decoder decodes the first stream of video content for play to sequentially reveal the plurality of features of the first stream in their respective time relationships in the first stream via a display driven by the IPTV compatible receiver device. At the IPTV compatible receiver device, a selection signal is received during the associated time interval during playback that selects the time period associated with the video feature being displayed. Upon receipt of the selection signal, the IPTV compatible receiver device accessing the metadata to identify a particular one of the collection of affiliate data streams that is associated with the time interval of the selected video feature. The IPTV compatible player device ceasing to play the first stream of video content and beginning playing the associated one of the collection of affiliate data streams that is associated with the time interval of the selected feature. Thus, the viewer directly navigates from one stream of video content to an affiliate video.

In certain embodiments, each of the video features constitutes a dominant image in the video during its associated time interval. In certain embodiments, an indicator such as an icon is displayed on the display that indicates that an affiliate video stream is available associated with the feature displayed during the associated time interval. In certain embodiments, data defining the indicator display is stored in the metadata.

Any of the above methods and apparatus can be implemented using a computer readable storage medium storing instructions which, executes instructions on one or more programmed processors.

Those skilled in the art will recognize, upon consideration of the above teachings, that certain of the above exemplary embodiments are based upon use of one or more programmed processors forming a part of a video player device such as an IPTV. However, the invention is not limited to such exemplary embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits, dedicated hard wired logic and combinations thereof may be used to construct alternative equivalent embodiments.

Certain embodiments described herein, are or may be implemented using one or more programmed processors executing programming instructions that are broadly described above in flow chart form that can be stored on any suitable electronic or computer readable storage medium. Moreover, data structures that facilitate operation on the video streams as described can be stored in any suitable storage medium including input and output buffer devices in reception and transmission devices, as well as in packaged media storing video content. However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While certain illustrative embodiments have been described, it is evident that many alternatives, modifications, permutations and variations will become apparent to those skilled in the art in light of the foregoing description.

What is claimed is:

1. A method of displaying a branched chain of Internet Protocol Television (IPTV) video content, comprising:
  receiving, at an IPTV compatible player device, a first stream of video content, the first stream of video content comprising a plurality of video images that each appear during at least one of a plurality of associated time intervals in the first stream of video content;
  accessing a collection of affiliate video streams that are each related to at least one of the plurality of video images that each appear during the at least one of the plurality of associated time intervals;
  accessing a set of metadata that associates the time intervals with one of the collection of affiliate video streams, where the metadata facilitates navigation to affiliated video streams that are related to the video image that appears during the associated time interval;
  playing the first stream of video content on the IPTV compatible player device to sequentially reveal at least a portion of the plurality of video images of the first stream in their respective time relationships in the first stream via a display driven by the IPTV compatible player device;
  at the IPTV compatible player device, receiving a selection signal during the associated time interval that selects the video image being displayed;
  in response to receipt of the selection signal at the IPTV compatible player device, the IPTV compatible player device:
    identifying, using the metadata, a particular one of the collection of affiliate video streams that is related to the video image that appears during the associated time interval of the selected video image;
    navigating to the identified particular one of the collection of affiliate video Streams; and
    ceasing to play the first stream of video content and beginning playing the associated one of the collection of affiliate video streams that is related to the video image that appears during the time interval of the selected image;
  wherein, a viewer directly navigates between the first stream of video content and the collection of affiliate video streams.

2. The method according to claim 1, wherein each of the video images comprises a dominant video image in the first stream of video content during its associated time interval.

3. The method according to claim 1, further comprising displaying an indicator on the display that indicates that the particular one of the collection of affiliate video streams is available that is related to the video image displayed during the associated time interval.

4. The method according to claim 1, further comprising resuming play of the first video stream after play of the particular one of the collection of affiliate video streams is completed.

5. The method according to claim 4, wherein data defining an indicator display is stored in the metadata.

6. The method according to claim 4, wherein the resuming is carried out as a result of receipt of a signal indicative of a selected option authorizing the resuming.

7. The method according to claim 1, wherein the particular one of the collection of affiliate video streams further comprises time periods that are linked to another set of metadata and another affiliate video stream.

8. The method according to claim 1, wherein the set of metadata provides links that lead to multiple levels of affiliate videos.

9. The method according to claim 1, wherein the metadata resides in one or more packets that precede the first video stream.

10. The method according to claim 1, wherein the metadata resides in one or more packets that are distributed throughout the first video stream.

11. The method according to claim 1, wherein the metadata references time stamps residing within the first stream of video content.

12. The method according to claim 1, wherein the first stream of video content comprises an affiliate video stream of another video stream.

13. The method according to claim 1, wherein responsive to receipt of the selection signal sending information defining a hierarchy position to a server which generates custom content for immediate display based upon a hierarchical position in a currently playing video stream.

14. The method according to claim 1, wherein the first stream of video content is delivered by one of a conventional terrestrial, cable or satellite television method and stored on a Personal Video Recorder (PVR), and wherein during playback, the accessing of the set of metadata is carried out during said playback.

15. A non-transitory computer readable storage medium storing instructions which, when executed on one or more programmed processors, carry out a method according to claim 1.

16. A method of displaying a branched chain of Internet Protocol Television (IPTV) video content, comprising:
  receiving, at an IPTV compatible player device, a first stream of video content, the first stream of video content comprising a plurality of video images that each appear during at least one of a plurality of associated time intervals in the first stream of video content, wherein at least some of the video images comprise a dominant video image in the first stream of video content during its associated time interval;
  accessing a collection of affiliate video streams that are each related to at least one of the plurality of video images that each appear during the at least one of the plurality of associated time intervals;
  accessing a set of metadata that associates the time intervals with one of the collection of affiliate video streams, where the metadata facilitates navigation to affiliated video streams that are related to the video image that appears during the associated time interval;
  playing the first stream of video content on the IPTV compatible player device to sequentially reveal at least a portion of the plurality of video images of the first stream in their respective time relationships in the first stream via a display driven by the IPTV compatible player device;
  displaying an indicator on the display that indicates that the particular one of the collection of affiliate video streams is available that is related to the video image displayed during the associated time interval;
  at the IPTV compatible player device, receiving a selection signal during the associated time interval that selects the video image being displayed;
  in response to receipt of the selection signal at the IPTV compatible player device, the IPTV compatible player device:
    identifying, using the metadata, a particular one of the collection of affiliate video streams that is related to the video image that appears during the associated time interval of the selected video image;
    navigating to the identified particular one of the collection of affiliate video streams;
    ceasing to play the first stream of video content and beginning playing the associated one of the collection of affiliate video streams that is related to the video image that appears during the time interval of the selected image;
    resuming play of the first video stream after play of the particular one of the collection of affiliate video streams is completed; and
  wherein, viewer directly navigates between the first stream of video content and the collection of affiliate video streams.

17. The method according to claim 16, wherein data defining the indicator display is stored in the metadata.

18. The method according to claim 16, wherein the resuming is carried out as a result of receipt of a signal indicative of a selected option authorizing the resuming.

19. The method according to claim 16, wherein the particular one of the collection of affiliate video streams further comprises time periods that are linked to another set of metadata and another affiliate video stream.

20. The method according to claim 16, wherein the set of metadata provides links that lead to multiple levels of affiliate videos.

21. The method according to claim 16, wherein the metadata resides in one or more packets that precede the first video stream.

22. The method according to claim 16, wherein the metadata resides in one or more packets that are distributed throughout the first video stream.

23. The method according to claim 16, wherein the metadata references time stamps residing within the first stream of video content.

24. The method according to claim 16, wherein responsive to receipt of the selection signal sending information defining a hierarchy position to a server which generates custom content for immediate display based upon a hierarchical position in a currently playing video stream.

25. The method according to claim 16, wherein the first stream of video content is delivered by one of a conventional terrestrial, cable or satellite television method and stored on a Personal Video Recorder (PVR), and wherein during playback, the accessing of the set of metadata is carried out during said playback.

26. An Internet Protocol Television (IPTV) receiver device, comprising:
  an Internet interface that receives a first stream of video content, the first stream of video content comprising a plurality of video images that each appear during at least one of a plurality of associated time intervals in the first stream of video content;
  the Internet interface further accessing a collection of affiliate video streams that are each related to at least one of the plurality of video images that each appear during the at least one of the plurality of associated time intervals;
  the Internet Interface further accessing a set of metadata that associates the time intervals with one of the collection of affiliate video streams, where the metadata facilitates navigation to affiliated video streams that are related to the video image that appears during the associated time interval;
  a decoder that decodes the first stream of video content for play to sequentially reveal at least a portion of the plurality of video images of the first stream in their respective time relationships in the first stream via a display driven by the IPTV receiver device;
  at the IPTV receiver device, receiving a selection signal during the associated time interval during playback that selects the time interval associated with the video image being displayed;
  in response to receipt of the selection signal, the IPTV receiver device identifying, using the metadata, a particular one of the collection of affiliate video streams that is related to the video image that appears during the associated time interval of the selected video image and navigating to the identified particular one of the collection of affiliate data streams; and
  the IPTV receiver device ceasing to play the first stream of video content and beginning playing the associated one of the collection of affiliate video streams that is related to the video image that appears during the time interval of the selected image;
  wherein, a viewer directly navigates between the first stream of video content and the collection of affiliate video streams.

27. The receiver device according to claim 26, wherein each of the video images comprises a dominant video image in the first stream of video content during its associated time interval.

28. The receiver device according to claim 26, further comprising means for displaying an indicator on the display that indicates that the particular one of the collection of affiliate video streams is available that is related to the video image displayed during the associated time interval.

29. The receiver device according to claim 28, wherein data defining the indicator display is stored in the metadata.

* * * * *